US012479680B2

(12) United States Patent
Tanaka

(10) Patent No.: US 12,479,680 B2
(45) Date of Patent: Nov. 25, 2025

(54) IMAGE FORMING APPARATUS

(71) Applicant: CANON KABUSHIKI KAISHA, Tokyo (JP)

(72) Inventor: Toshinori Tanaka, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 484 days.

(21) Appl. No.: 17/981,510

(22) Filed: Nov. 7, 2022

(65) Prior Publication Data

US 2023/0141061 A1 May 11, 2023

(30) Foreign Application Priority Data

Nov. 9, 2021 (JP) ................................ 2021-182380

(51) Int. Cl.
*B65H 5/06* (2006.01)
*B41J 11/00* (2006.01)
*B41J 25/308* (2006.01)
*B41J 29/02* (2006.01)
*B41J 29/13* (2006.01)

(52) U.S. Cl.
CPC ............ *B65H 5/06* (2013.01); *B41J 11/0095* (2013.01); *B41J 25/3082* (2013.01); *B41J 29/02* (2013.01); *B41J 29/13* (2013.01)

(58) Field of Classification Search
None
See application file for complete search history.

(56) References Cited

U.S. PATENT DOCUMENTS

2010/0091315 A1* 4/2010 Shiraki .............. H04N 1/00631 358/1.13

FOREIGN PATENT DOCUMENTS

JP 2010091989 A 4/2010
JP 2018013571 A 1/2018
JP 2018138996 A 9/2018
JP 2021157201 A 10/2021

* cited by examiner

*Primary Examiner* — Erica S Lin
(74) *Attorney, Agent, or Firm* — ROSSI, KIMMS & McDOWELL LLP

(57) ABSTRACT

An image forming apparatus includes an image forming unit, a casing, a document reading unit, a sheet discharge unit, a sheet supporting portion, an operation unit, and a supporting unit. If a region which a plurality of the recording material occupies when a maximum number of a maximum size of a recording material supportable on the sheet supporting portion is supported is defined as an occupied region, the operation unit is disposed such that a part of the operation unit in a width direction overlaps the occupied region. The rotational axis is positioned downstream of a center of the operation unit in the sheet discharge direction and downstream of the document reading unit in the sheet discharge direction. The supporting unit supports the operation unit such that, when the operation unit is positioned in a second position, a lower end of the operation unit is positioned above the occupied region.

10 Claims, 7 Drawing Sheets

IMAGE FORMING APPARATUS

BACKGROUND OF THE INVENTION

Field of the Invention

This disclosure relates to an image forming apparatus such as a printer, a copier, a facsimile, or an integrated machine.

Description of the Related Art

In an image forming apparatus such as a printer, a copier, a facsimile, or an integrated machine, an operation panel including a touch panel operable by a user at the time of operating the image forming apparatus is disposed. So as to improve the readability of the touch panel, the operation panel is disposed such that the whole of the operation panel is pivotable with respect to the image forming apparatus so as to make it possible to change an angle of the operation panel (refer to Japanese Patent Laid-Open No. 2021-157201). In the apparatus described in Japanese Patent Laid-Open No. 2021-157201, a pivot shaft of the operation panel is disposed at the center with respect to a short direction of the operation panel.

Recently, so as to improve the readability and operability of the user, it is requested to increase the size of a display disposed in the operation panel. On the other hand, the whole of the image forming apparatus is requested to be compact. So as to satisfy these requests, it is conceivable that the operation panel is disposed such that a part of the operation panel overlaps a sheet discharge tray in a left-right direction (width direction) of the image forming apparatus. However, in a case of the apparatus described in Japanese Patent Laid-Open No. 2021-157201 described above, it is difficult to apply the above-mentioned configuration where the operating panel overlaps the sheet discharge tray. This is because there is the possibility that, in the apparatus described in Japanese Patent Laid-Open No. 2021-157201, in a case where the operation panel pivots, the part of the operation panel enters into a loading space of a sheet discharged onto the sheet discharge tray and, accordingly, decreases a loading amount of the sheet discharged onto the sheet discharge tray.

In view of the above-mentioned problem, the purpose of this disclosure is, in the configuration where the part of the operation panel overlaps the sheet discharge tray in the left-right direction of the image forming apparatus, to provide the image forming apparatus that is capable of suppressing the decrease in the loading capacity of the sheet discharge tray.

SUMMARY OF THE INVENTION

According to a first aspect of the present invention, an image forming apparatus includes an image forming unit configured to form an image on a recording material, a casing accommodating the image forming unit, the casing having a space portion provided at an upper side of the casing and exposing to an outside of the casing, a document reading unit disposed above the space portion in a vertical direction, the document reading unit including a document stand configured to support a document and an image reading unit configured to read an image of the document supported on the document stand, a sheet discharge unit configured to discharge a recording material on which an image is formed by the image forming unit from an inside of the casing to the space portion, a sheet supporting portion disposed at a bottom portion of the space portion and configured to support a recording material discharged by the sheet discharge unit, an operation unit disposed above the casing in the vertical direction and downstream of the document reading unit in a sheet discharge direction of a recording material discharged by the sheet discharge unit, the operation unit including a display surface, and a supporting unit rotatably supporting the operation unit with respect to the casing. If a region which a plurality of the recording material occupies in a case where a maximum number of a maximum size of a recording material supportable on the sheet supporting portion is supported is defined as an occupied region, the operation unit is disposed such that a part of the operation unit in a width direction intersecting with the vertical direction and the sheet discharge direction overlaps the occupied region when viewed in the vertical direction. The supporting unit is configured to rotatably support the operation unit between a first position and a second position, the second position being a position where a tilt angle of the display surface with respect to a horizontal direction is larger than a tilt angle in the first position. A rotational axis around which the supporting unit rotatably supports the operation unit is positioned downstream of a center of the operation unit in the sheet discharge direction and downstream of the document reading unit in the sheet discharge direction. The supporting unit supports the operation unit such that, in a case where the operation unit is positioned in the second position, a lower end of the operation unit is positioned above the occupied region in the vertical direction.

Further features of the present invention will become apparent from the following description of exemplary embodiments with reference to the attached drawings.

DESCRIPTION OF THE EMBODIMENTS

Image Forming Apparatus

Figure 1:
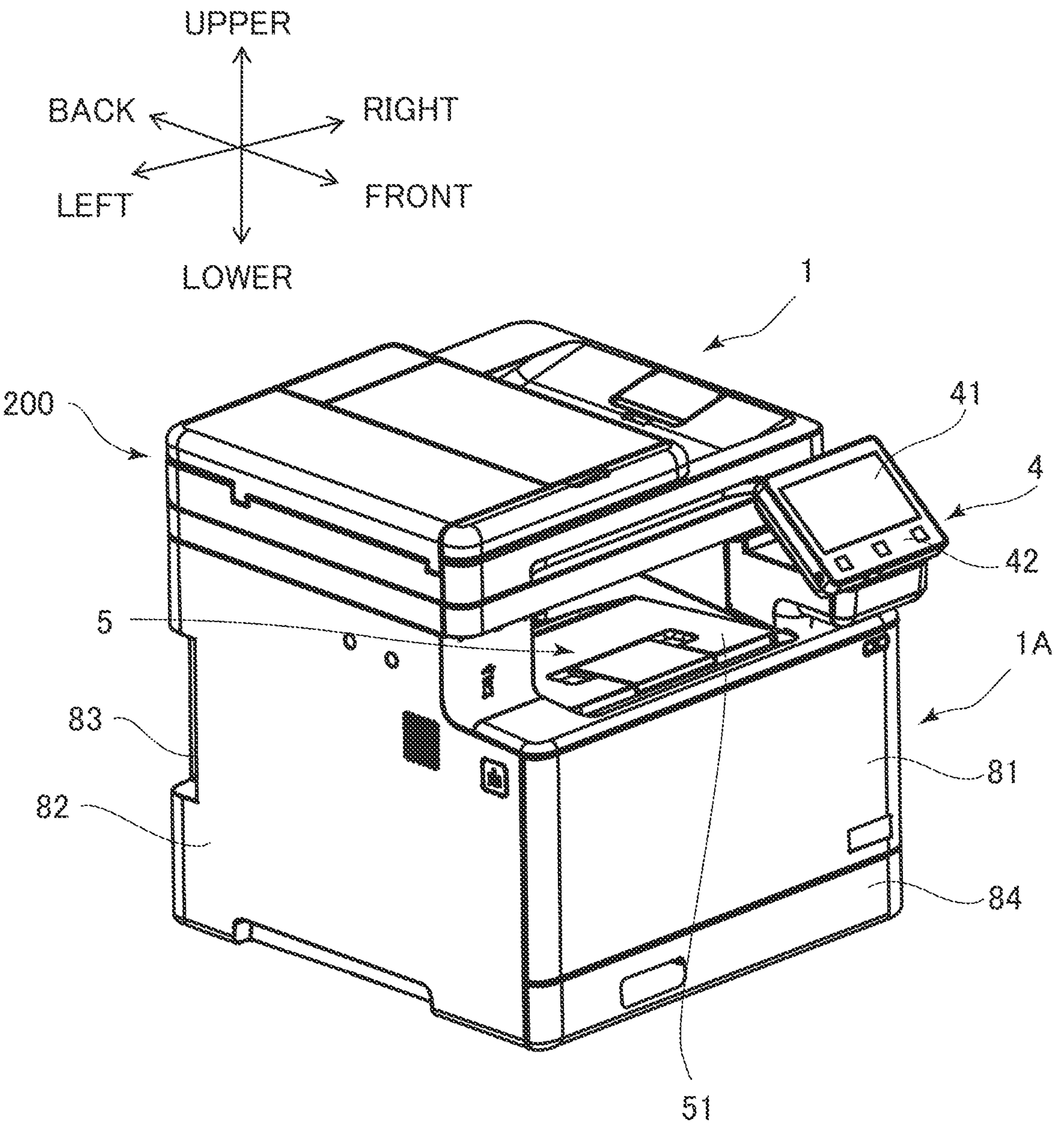
FIG. 1 is a perspective view showing an image forming apparatus of this embodiment.

Hereinafter, this embodiment will be described. First, using FIGS. 1 and 2, an overview of an image forming apparatus of this embodiment will be described. As shown in FIG. 1, the image forming apparatus 1 of this embodiment is the image forming apparatus of a so-called in-body discharge type, and, when roughly divided, includes a casing 1A, a document reading unit 200, and an operation unit 4. The document reading unit 200 is disposed on the top of the casing 1A, and a sheet discharge opening portion 5, serving as a space portion for discharging a recording material from the casing 1A, is formed between the casing 1A and the document reading unit 200. That is, the sheet discharge opening portion 5 is provided at an upper side of the casing 1A and exposing to an outside of the casing 1A. Inside of the space of the sheet discharge opening portion 5, a sheet discharge tray 51, serving as a sheet supporting portion for loading the recording material discharged from the inside of the casing 1A is disposed on an upper surface of the casing 1A. That is, the sheet discharge tray 51 is provided at a bottom portion of the sheet discharge opening portion 5. In the image forming apparatus 1 of this embodiment, the recording material on which an image has been formed is discharged from the inside of the casing 1A to the sheet discharge tray 51 in a sheet discharge direction from a back face (back) side toward a front face (front) side. Further, the operation unit 4 is disposed on the front face side of the casing 1A.

To be noted, in this description, a side on which a user stands at the time of operating the operation unit 4 so as to operate the image forming apparatus 1 is referred to as the front face (or front), and the opposite side is referred to as the back face (or back). Further, a right side when viewed from the front face is referred to as right, and a left side when viewed from the front face is referred to as left. Further, an upper side when viewed from the front face is referred to as "upper", and a lower side when viewed from the front face is referred to as "lower". Therefore, in a case of the embodiment shown in FIG. 1, when viewed from the front face, the operation unit 4 is disposed on the right side from the center in the upper side of the casing 1A.

While illustrations are omitted, the casing 1A includes, for example, a left side plate and a right side plate disposed on the left and right sides so as to support each unit and a plurality of sheet metals, such as a stay coupling these left and right side plates to each other, and an outer circumference of the casing 1A is covered by an exterior cover configuring the appearance of the image forming apparatus 1. The casing 1A includes a front cover 81 and a cassette cover 84 on the front face side as the exterior cover. As shown in FIG. 1, the front cover 81 is disposed on the upper side of the cassette cover 84 in the vertical direction. Further, side face covers 82 are disposed on both sides in a width direction (left-right) as the exterior cover, and a back face cover 83 is disposed on the back face. The front cover 81 is disposed detachably from the casing 1A, and the cassette cover 84 is provided to a cassette 40 (refer to FIG. 3), described below, and is disposed in a manner withdrawable, integrally with the cassette 40, from the casing 1A toward the front face.

Figure 2:
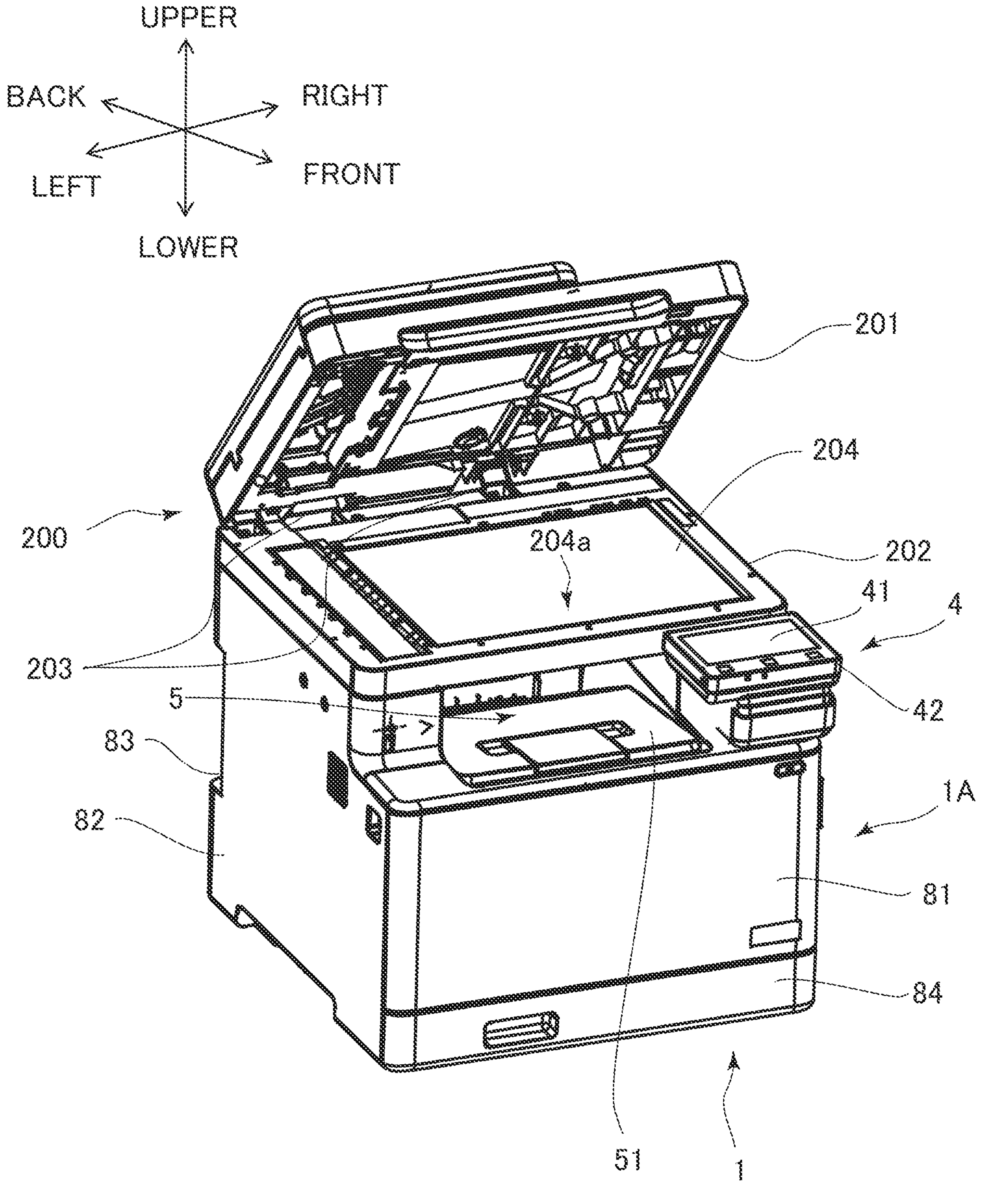
FIG. 2 is a perspective view showing the image forming apparatus in a state where a document stand is opened.

The document reading unit 200 will be described. As shown in FIG. 2, the document reading unit 200 includes a document conveying unit 201 and an image reading unit 202. By swinging from a swing portion 203, the front face side of the document conveying unit 201 is openable with respect to the image reading unit 202. A user can load a document containing the image, which is desired for reading, on the document conveying unit 201. In a closed state shown in FIG. 1, the document conveying unit 201 can automatically convey the document to the image reading unit 202 one sheet at a time. The image reading unit 202 includes a flat document stand 204 and a reading sensor, not shown, and reads the image of the document placed on the document stand 204 one sheet at a time by the reading sensor, not shown. To be noted, the user can place the document on the document stand 204 in a state where the document conveying unit 201 is opened, and, by closing the document conveying unit 201 with the document placed on the document stand 204, can also allow the reading sensor to read the image of the document.

Figure 3:
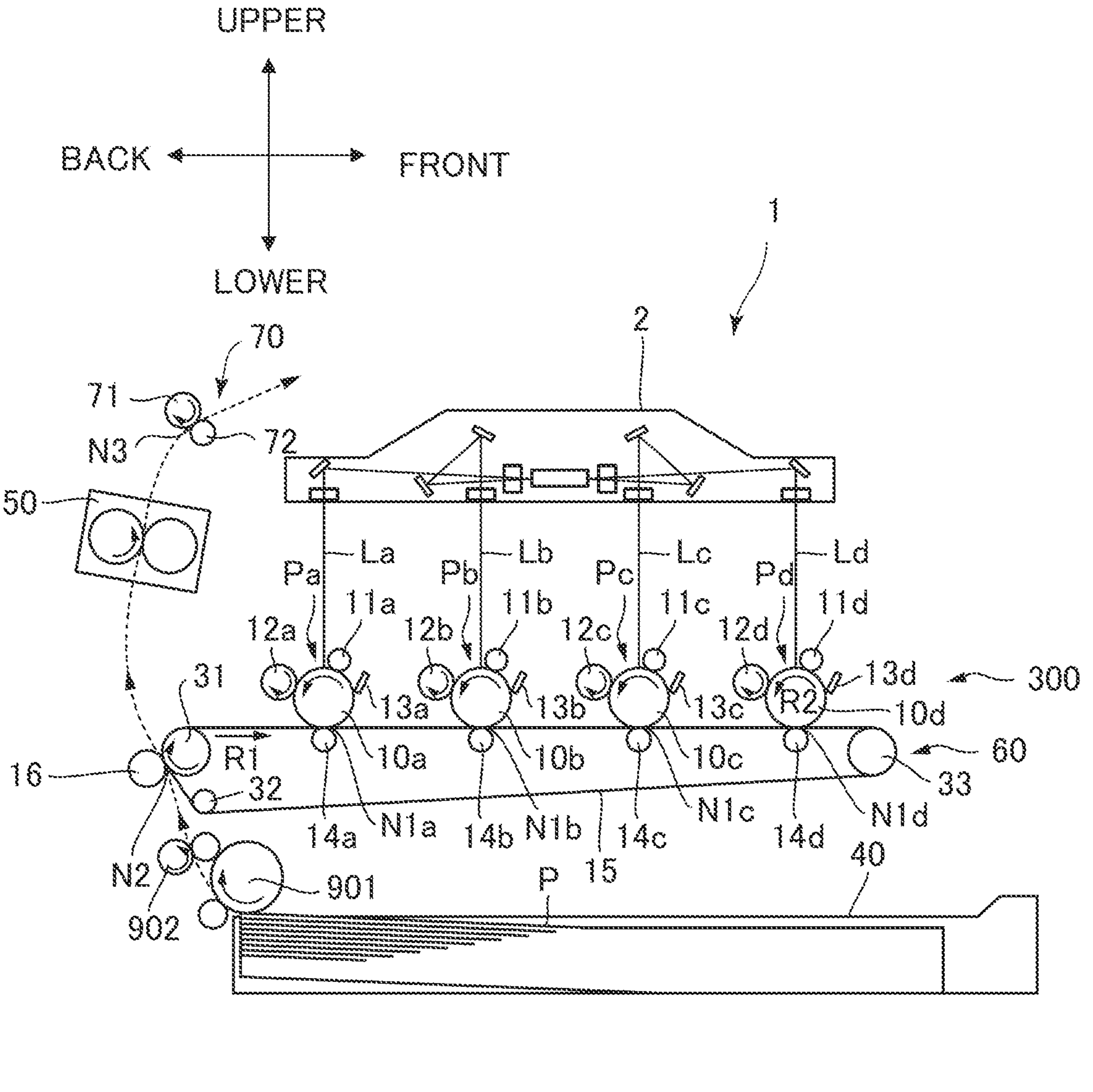
FIG. 3 is a schematic diagram showing a configuration of the image forming apparatus.

Next, a configuration of the image forming apparatus 1 relating to image formation will be described using FIG. 3. As shown in FIG. 3, the image forming apparatus 1 of this embodiment is a full color printer of an electrophotographic system including image forming units Pa, Pb, Pc, and Pd of yellow, magenta, cyan, and black along an intermediate transfer belt 15. The image forming apparatus 1 receives image information from the document reading unit 200 described above or an external apparatus, not shown, such as a personal computer, and forms a toner image on a recording material P based on the received image information. The recording material P includes various kinds of sheet materials which includes paper such as standard paper, cardboard, rough paper, uneven paper, and coated paper, a plastic film, cloth, and the like.

As shown in FIG. 3, in this embodiment, an intermediate transfer unit 60 is disposed under the image forming units Pa to Pd. The intermediate transfer unit 60 is configured such that an endless intermediate transfer belt 15 is moved in an arrow R1 direction by being stretched over a plurality of rollers 31, 32, and 33. A secondary transfer outer roller 16 is disposed in a position facing the roller 31 stretching the intermediate transfer belt 15 across the intermediate transfer belt 15, and forms a secondary transfer nip portion N2 for transferring the toner image borne on the intermediate transfer belt 15 onto the recording material P. The secondary transfer nip portion N2 is a nip portion formed by the roller 31 and the secondary transfer outer roller 16, and, for example, the toner image is transferred onto the recording material P in response to the application of a secondary transfer voltage from a power source, not shown, to the secondary transfer outer roller 16.

A process to form, for example, a full color image of four colors by the image forming apparatus 1 will be described. However, the four image forming units Pa to Pd included in the image forming apparatus 1 are substantially the same in a configuration except for differences in developing colors. Therefore, the image forming unit Pd of black will be described as a representative, and descriptions of the other image forming units Pa to Pc will be omitted herein.

The image forming unit Pd includes a photosensitive drum 10*d*, serving as a photosensitive member. The photosensitive drum 10*d* is rotatably driven in an arrow R2 direction by a drum driving motor, not shown. A charge unit 11*d*, a developing unit 12*d*, a primary transfer roller 14*d*, and a cleaning unit 13*d* are disposed around this photosensitive drum 10*d*.

When an image forming operation has started, at first, a surface of the rotating photosensitive drum 10*d* is uniformly charged by the charge unit 11*d*. Next, the surface of the charged photosensitive drum 10*d* is exposed by a laser beam Ld irradiated from an exposing unit 2 corresponding to an image signal. Thereby, an electrostatic latent image corresponding to the image signal is formed on the photosensitive drum 10*d*. The electrostatic latent image formed on the photosensitive drum 10*d* is developed to the toner image with the developer stored inside of the developing unit 12*d*. In a case of this embodiment, one single exposing unit 2 is disposed above the image forming units Pa to Pd, and a plurality of photosensitive drums 10*a* to 10*d* are exposed only by the one single exposing unit 2. That is, the one single exposing unit 2 is shared by the image forming units Pa to Pd for exposure.

The toner image formed on the photosensitive drum 10*d* is primarily transferred onto the intermediate transfer belt 15 in a primary transfer nip portion N1*d* formed with the primary transfer roller 14*d* disposed across the intermediate transfer belt 15. At this time, a primary transfer voltage is applied from a power source, not shown, to the primary transfer roller 14*d*. The intermediate transfer belt 15 bears and conveys the toner image transferred from the photosensitive drum 10*d*. To be noted, an adhering matter such as a toner remained on the surface of the photosensitive drum 10*d* after the primary transfer is collected by the cleaning unit 13*d*.

The image forming units Pa to Pd of yellow, magenta, cyan, and black perform these operations in sequence, and superimpose the toner images of the four colors on the intermediate transfer belt 15. Thereafter, the recording material P stored in the cassette 40 is conveyed to the secondary transfer nip portion N2 in the timing synchronizing with the formation of the toner image.

The cassette 40 is disposed in the lower side of the casing 1A, and is capable of storing a large number of sheets of the recording material P. A sheet feed roller 901 feeds the recording material P from the cassette 40 toward a registration roller 902 one sheet at a time. The registration roller 902 corrects the skew of the recording material P, and conveys the recording material P to the secondary transfer nip portion N2 synchronously with the toner image on the intermediate transfer belt 15. Then, in response to the application of the secondary transfer voltage from a power source, not shown, to the secondary transfer outer roller 16, the toner image on the intermediate transfer belt 15 is secondarily transferred onto the recording material P.

The recording material P onto which the toner image has been secondarily transferred is conveyed to a fixing unit 50. The fixing unit 50, while conveying the recording material P, heats and presses the recording material P, and fixes the toner image on the recording material P. The recording material P on which the toner image has been fixed by the fixing unit 50 is conveyed upward (i.e., vertical conveyance), and, by being discharged toward the front face from the inside of the casing 1A to the outside by a sheet discharge unit 70, is loaded on the sheet discharge tray 51 (refer to FIG. 1). The sheet discharge unit 70 includes a first roller 71 and a second roller 72, and the first and second rollers 71 and 72 form a sheet discharge nip portion N3 capable of nipping and conveying the recording material P by coming into contact with each other.

To be noted, in this embodiment, the image forming units Pa to Pd, the intermediate transfer unit 60, the secondary transfer outer roller 16, and the like are included in an image formation unit 300 which forms the toner image on the recording material P. Further, the exposing unit 2, the image formation unit 300, the fixing unit 50, the sheet feed roller 901, the registration roller 902, the sheet discharge unit 70, and the cassette 40 described above are housed inside of the casing 1A (refer to FIG. 1).

Operation Unit

Next, with reference to FIG. 1, the operation unit 4 will be described using FIGS. 4 to 7. As understood by referring to FIG. 1, the operation unit 4 which the user operates for operating the image forming apparatus 1 is disposed on the casing 1A in a manner capable of facing the front face. The operation unit 4 includes a large size display 41 (for example, a 3 to 6 inches liquid crystal monitor and the like) and an input unit 42 in which the size of a button, a switch, and the like is enlarged for improving the operability of the user. To be noted, it is acceptable to use a touch panel, which allows an operation similar to the input unit 42, such as, for example, the input of an image forming job and the selection of the recording material P, in response to a touch operation of the user on a screen, as the display 41.

The operation unit 4 is disposed on the casing 1A in such a manner that it is possible to variably tilt and adjust an orientation of a display surface of the display 41 vertically around an axis in the left-right direction (a width direction intersecting with the vertical direction and the sheet discharge direction of the recording material P). The operation unit 4 is disposed in a manner pivotable to an arbitrary tilt angle (for example, zero to forty degrees) with respect to the horizontal direction so as to meet a sight line height of a broad range of users, for example, from a tall user to a user sitting in a wheelchair. FIG. 1 shows a case where the operation unit 4 is in an elevated surface position by being pivoted to a maximum tilt angle, and FIG. 2 shows a case where the operation unit 4 is a case where the operation unit 4 is in a substantially horizontal position by being pivoted to a minimum tilt angle. To be noted, in this description, using the horizontal direction, which is zero degree, as a reference, the substantially horizontal position of the operation unit 4 includes a state where the operation unit 4 substantially tilts within five degrees from the horizontal direction (that is, −5 degrees to +5 degrees).

Supporting Unit

Figure 4:
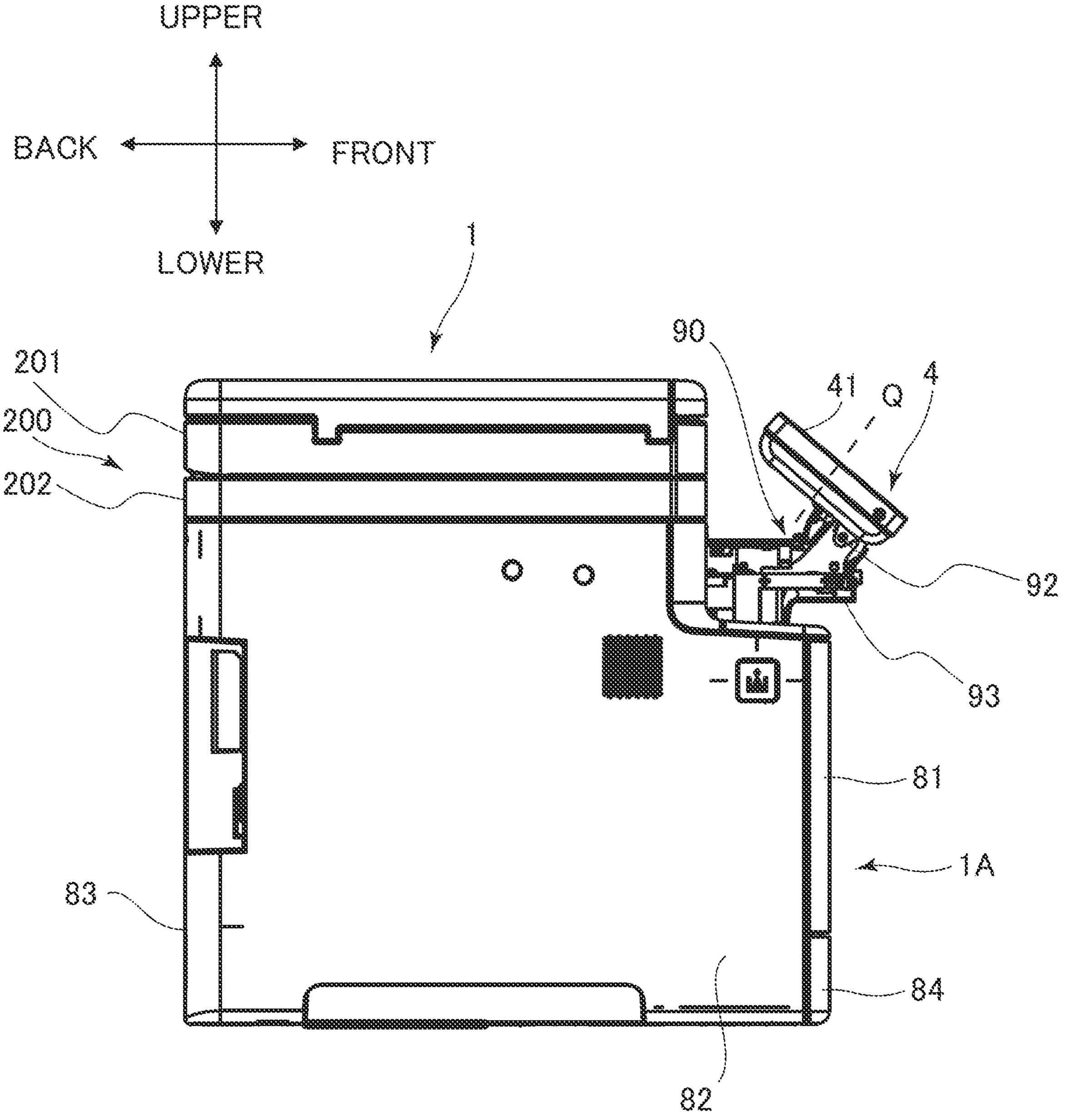
FIG. 4 is a side view showing the image forming apparatus.

In a case where the user adjusts the angle of the operation unit 4 in accordance with the sight line height within a range from the minimum tilt angle of zero degree to the maximum tilt angle of forty degrees, the user can grasp and pivot the operation unit 4. So as to make it possible to perform such an operation, as shown in FIG. 4, the operation unit 4 is supported by a supporting unit 90 whose angle is freely adjustable. The operation unit 4 is pivotably supported by the supporting unit 90 at a position downstream of the center (shown by a dotted line Q in FIG. 4) in the sheet discharge direction with respect to a short direction (front-back direction shown in FIG. 7) of the operation unit 4.

The supporting unit 90 includes a fixing portion 93 fixed to the casing 1A and a pivot holding portion 92 pivotably holding the operation unit 4. The pivot holding portion 92 is provided to the fixing portion 93. The operation unit 4 is rotatably provided to the casing 1A via the fixing portion 93 and the pivot holding portion 92. While an illustration is omitted, a free stop hinge holding the pivot holding portion 92 at an arbitrary angle by friction is disposed in the pivot holding portion 92. While there are several types of the free stop hinges, for example, a pipe type in which a metallic shaft is press fitted into a resin pipe is acceptable. The supporting unit 90 pivotably support the operation unit 4 by changing the angle of the display surface of the display 41 in the vertical direction between a first position (substantially horizontal position), where the angle of the display surface of the display 41 becomes the minimum tilt angle with respect to the horizontal direction, and a second position (elevated surface position), where the angle of the display surface of the display 41 becomes the maximum tilt angle with respect to the horizontal direction.

Disposition of Operation Unit

Figure 5:
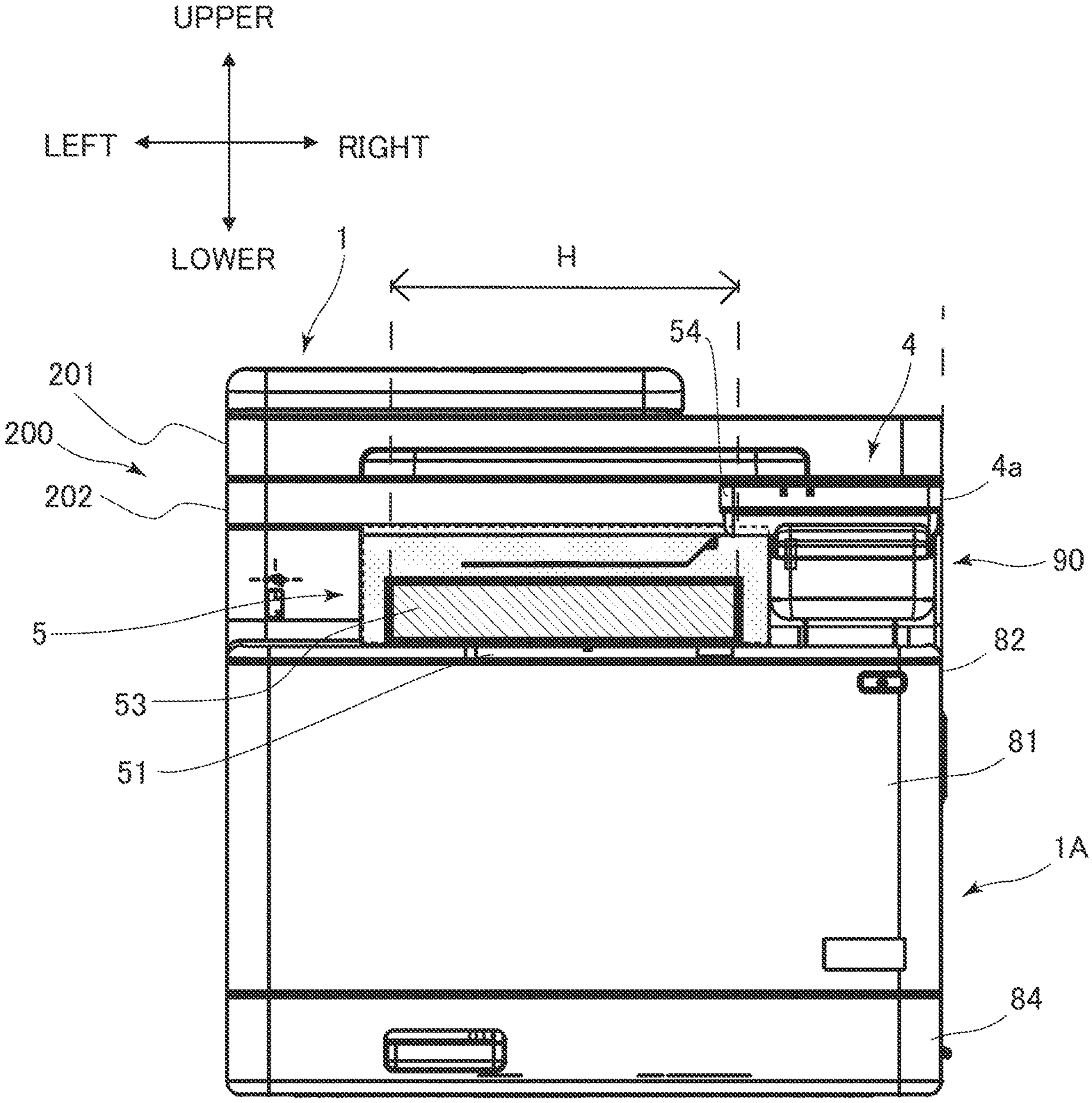
FIG. 5 is a front view showing the image forming apparatus.

Next, a disposition of the operation unit 4 will be described. First, the disposition of the operation unit 4 in the left-right direction will be described using FIG. 5. FIG. 5 is a front view showing the image forming apparatus 1. FIG.

5 is for describing the disposition of the operation unit 4 in the left-right direction, and the operation unit 4 is in the substantially horizontal position.

As described above, the sheet discharge opening portion 5 is formed on the upper portion of the casing 1A and opens to the front face of the image forming apparatus 1, and the sheet discharge tray 51 is disposed in this sheet discharge opening portion 5. As shown in FIG. 5, the user can retrieve the recording material P loaded on the sheet discharge tray 51 from the space of the sheet discharge opening portion 5 surrounded by the document reading unit 200 (in particular, the image reading unit 202), the casing 1A, and the sheet discharge tray 51. Here, there is a sheet loading space 53 serving as an occupied region in the sheet discharge opening portion 5. In this description, the sheet loading space 53 is a space which the loaded recording material P occupies in a case where a maximum number of a maximum size of the recording material P loadable on the sheet discharge tray 51 is loaded. Therefore, the space of the sheet loading space 53 occupying the space of sheet discharge opening portion 5 is determined by a maximum width of a conveyable recording material P and a loadable height of the sheet discharge tray 51. The size of the sheet loading space 53 is, for example, 210 mm in width, 23 mm in height, and a maximum number of sheets loadable in case of A4 size standard paper is 100 sheets.

In this embodiment, for achieving the miniaturization of the image forming apparatus 1 in the left-right direction, as shown in FIG. 5, the operation unit 4 is disposed so as not to project from a wall surface of the side face cover 82 on the right side. That is, the operation unit 4 is positioned inside of both sides of the casing 1A in the width direction. However, in such a case, since the operation unit 4 is formed in a large size such that the left-right direction becomes a longitudinal direction, part (called as a projection portion 54) of the operation unit 4 overlaps a space H of the sheet loading space 53 in the left-right direction. However, in a case where the projection portion 54 of the operation unit 4 overlaps the space H of the sheet loading space 53 in the left-right direction, it is not desirable that the discharge of the recording material P is prevented by an abutment of the recording material P discharged by the sheet discharge unit 70 onto the projection portion 54.

Therefore, in this embodiment, the disposition of the operation unit 4 in the front-back direction is determined such that the discharged recording material P does not abut onto the projection portion 54. The supporting unit 90 is disposed so as not to overlap the space H of the sheet loading space 53 in the left-right direction. Descriptions are as follows.

Figure 6:
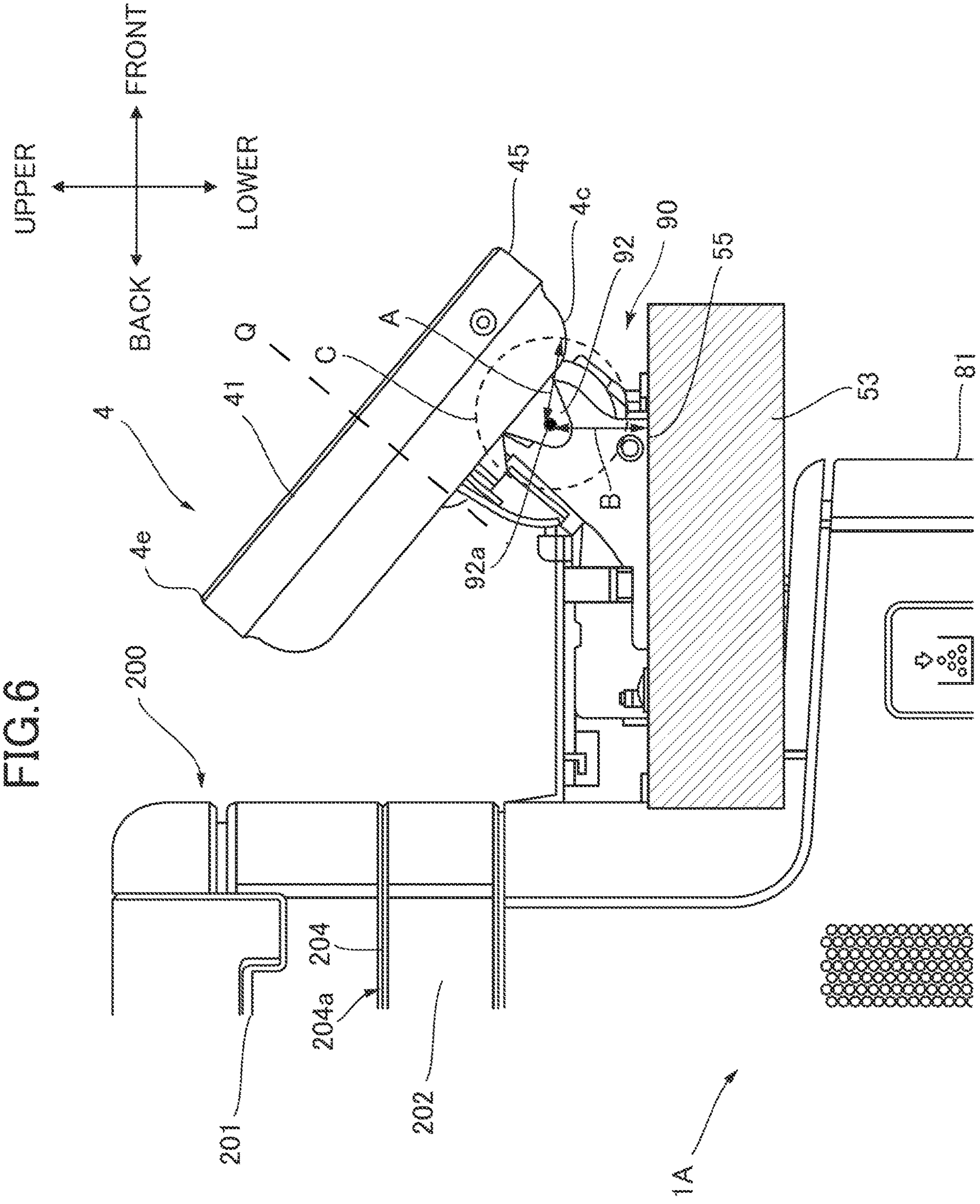
FIG. 6 is a side view showing, in an enlarged manner, an operation unit in an elevated surface position.
Figure 7:
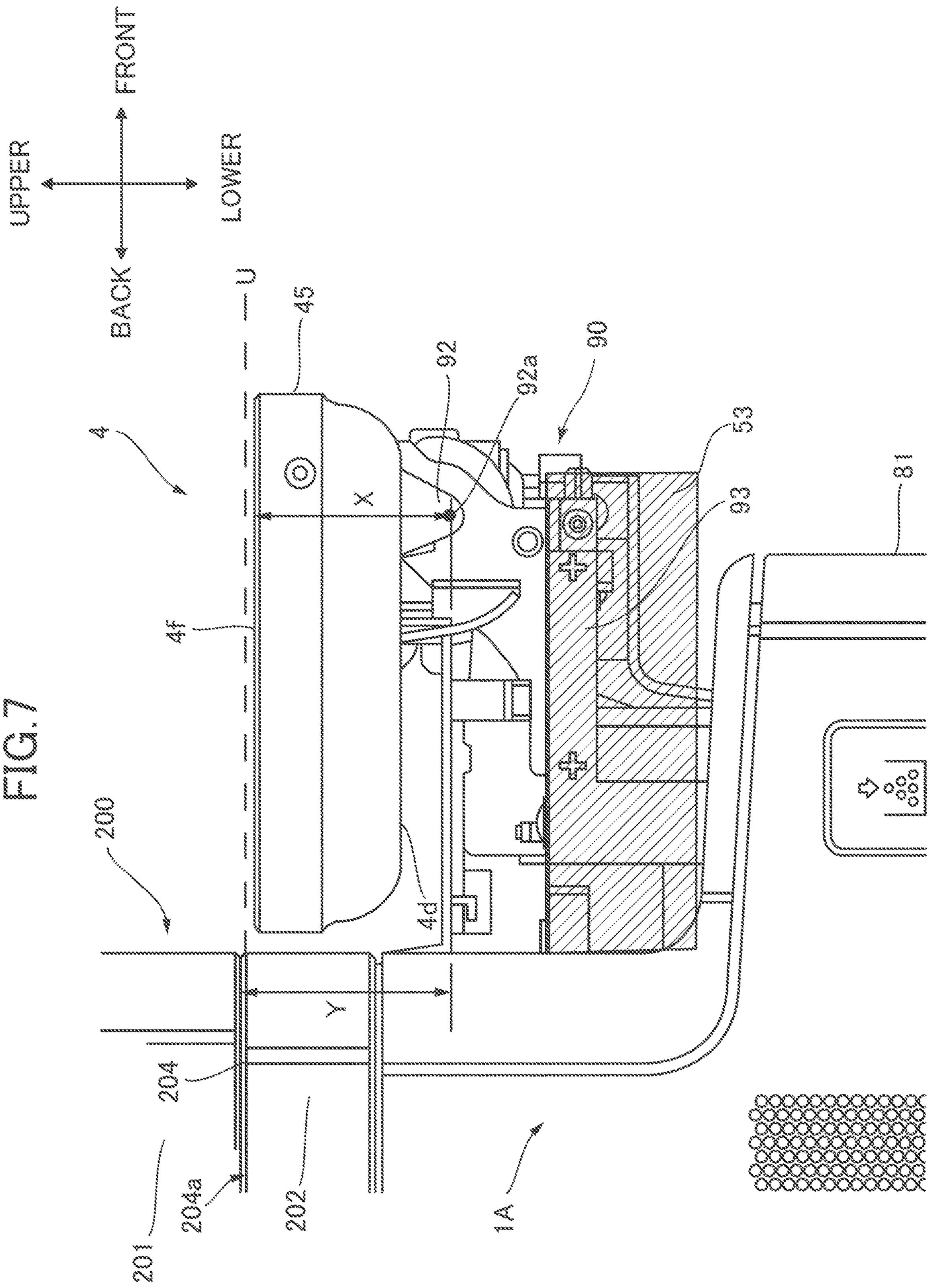
FIG. 7 is a side view showing, in an enlarged manner, the operation unit in a substantially horizontal position.

The disposition of the operation unit 4 in the front-back direction and the vertical direction will be described using FIGS. 6 and 7. FIGS. 6 and 7 are side views showing, in an enlarged manner, the operation unit 4 for describing the disposition of the operation unit 4 in the front-back direction and the vertical direction. FIG. 6 shows the case where the operation unit 4 is in the elevated surface position, and FIG. 7 shows the case where the operation unit 4 is in the substantially horizontal position.

As shown in FIG. 6, the supporting unit 90 is disposed such that a pivot axis 92*a*, serving as a rotational axis, of the pivot holding portion 92 is positioned downstream (front direction) of the document reading unit 200 with respect to the sheet discharge direction. The pivot axis 92*a* is positioned downstream of a center of the operation unit 4 in the sheet discharge direction. In this embodiment, the supporting unit 90 is disposed such that the pivot axis 92*a* is positioned downstream of the closed front cover 81 with respect to the sheet discharge direction, and supports the operation unit 4. Also, the closed document conveying unit 201 is disposed upstream of the operation unit 4 in the sheet discharge direction.

Then, in the case where the operation unit 4 is in the elevated surface position, the supporting unit 90 supports the operation unit 4 such that a lower end 4*c* of the operation unit 4 is positioned above the sheet loading space 53 in the vertical direction. That is, the pivot axis 92*a* of the pivot holding portion 92 is in a position where a shortest point 55, at which a distance between the pivot axis 92*a* and the sheet loading space 53 is a shortest distance B, becomes outside of a pivot circle C whose radius is a distance A from the lower end 4*c* of the operation unit 4 to the pivot axis 92*a*. Here, the lower end 4*c* is a portion which is a lowermost end of the operation unit 4 in the vertical direction in the case where the operation unit 4 is in the elevated surface position. To be noted, in the case where the operation unit 4 is in the elevated surface position, an upper end 4*e* of the operation unit 4 is positioned above a placement surface 204*a* serving as a supporting surface of the document stand 204 in the vertical direction. Here, the upper end 4*e* is a portion which is an uppermost end of the operation unit 4 in the vertical direction in the case where the operation unit 4 is in the elevated surface position. Thereby, in the case where the operation unit 4 is in the elevated surface position, since the operation unit 4 is secured by raising the angle sufficiently, even the user, for example, sitting in the wheelchair can obtain high readability and operability.

Further, as shown in FIG. 7, in the case where the operation unit 4 is in the substantially horizontal position, the supporting unit 90 supports the operation unit 4 such that a lower surface 4*d* of the operation unit 4 is positioned above the sheet loading space 53 in the vertical direction. Further, in the case where the operation unit 4 is in the substantially horizontal position, the supporting unit 90 supports the operation unit 4 such that an upper surface 4*f* (in particular, the display surface of the display 41) of the operation unit 4 is positioned at the height equal to or lower than the height of the placement surface 204*a* of the document table 204 in the vertical direction (refer to a dotted line U in FIG. 7). More preferably, in the case where the operation unit 4 is in the substantially horizontal position, the supporting unit 90 supports the operation unit 4 such that the upper surface 4*f* of the operation unit 4 is substantially flushed with the placement surface 204*a* of the document table 204 in the vertical direction. Here, "substantially flushed" means a case where a height difference between the upper surface 4*f* and the placement surface 204*a* is, for example, equal to or less than 2 mm. In this embodiment, the pivot axis 92*a* of the pivot holding portion 92 is in a position where a relationship between a vertical distance X from the display surface (upper surface 4*f*) of the display 41 to the pivot axis 92*a* and a vertical distance Y from the pivot axis 92*a* to the placement surface 204*a* of the document stand 204 becomes such that X is equal to or less than Y. The above-mentioned vertical distances X and Y are respectively, for example, 37 mm and 38 mm.

As described above, in this embodiment, the supporting unit 90 pivotably supporting the operation unit 4 in the position downstream of the center with respect to the short direction of the operation unit 4 is disposed such that the pivot axis 92*a* of the pivot holding portion 92 is positioned in the position described above. That is, the pivot axis 92*a* is positioned downstream of the center of the operation unit 4 in the sheet discharge direction. Thereby, even in a case where the operation unit 4 is disposed such that the projection portion 54 of the operation unit 4 overlaps the space H of the sheet loading space 53 in the left-right direction, the discharged recording material P is loaded on the sheet discharge tray 51 without abutting onto the operation unit 4. Further, in the case where the operation unit 4 is in the substantially horizontal position, since the operation unit 4 is disposed at the height equal to or lower than the height of the placement surface 204*a* of the document table 204 in the vertical direction, the operation unit 4 does not interfere at the time of the placement of the document on the document stand 204 by the user. As described above, in the configuration in which the part of the operation unit 4 overlaps with respect to the sheet discharge tray 51 (more particularly, the sheet loading space 53) in the image forming apparatus 1, it is possible to achieve to suppress the decrease in the capacity loading the recording material P on the sheet discharge tray 51 by a simple configuration.

To be noted, the embodiment described above is not limited to the image forming apparatus of the electrophotographic system forming the toner image on the recording material by using the developer containing the toner and a carrier, and it is acceptable to apply the embodiment to an image forming apparatus of the other system. For example, it is possible to apply the embodiment to an image forming apparatus of such as an ink jet system which forms the image by ejecting an ink to the recording material.

By this disclosure, in a configuration where a part of the operation panel overlaps with respect to the sheet discharge tray in the left-right direction of the image forming apparatus, it is possible to suppress the decrease in the loading capacity of the sheet discharge tray.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-182380, filed Nov. 9, 2021 which is hereby incorporated by reference herein in its entirety.

What is claimed is:

1. An image forming apparatus comprising:

an image forming unit configured to form an image on a recording material;

a casing accommodating the image forming unit, the casing including a space portion provided at an upper side of the casing and exposing to outside of the casing;

a document reading unit disposed above the space portion in a vertical direction, the document reading unit including a document stand configured to support a document and an image reading unit configured to read an image of the document supported on the document stand;

a sheet discharge unit configured to discharge a recording material on which an image is formed by the image forming unit from inside of the casing to the space portion;

a sheet supporting portion disposed at a bottom portion of the space portion and configured to support a recording material discharged by the sheet discharge unit;

an operation unit disposed above the casing in the vertical direction and downstream of the document reading unit in a sheet discharge direction of a recording material discharged by the sheet discharge unit, the operation unit including a display surface; and a supporting unit rotatably supporting the operation unit with respect to the casing, wherein, where an occupied region is where a plurality of the recording material occupies in a case where a maximum number of a maximum size of a recording material supportable on the sheet supporting portion is supported, the operation unit is disposed such that part of the operation unit in a width direction intersecting with the vertical direction and the sheet discharge direction overlaps the occupied region as viewed in the vertical direction, wherein the casing includes a front cover configured to open toward a downstream side in the sheet discharge direction, wherein the supporting unit is configured to rotatably support the operation unit about a rotational axis, between a first position and a second position, the second position being a position where a tilt angle of the display surface with respect to a horizontal direction is larger than a tilt angle in the first position, wherein the rotational axis is positioned downstream of, in the sheet discharge direction:

a center of the operation unit in the sheet discharge direction;

the document reading unit in the sheet discharge direction; and the closed front cover, and wherein the supporting unit supports the operation unit such that, in a case where the operation unit is positioned in the second position, a lower end of the operation unit is positioned above the occupied region in the vertical direction.

2. The image forming apparatus according to claim 1, wherein the supporting unit supports the operation unit such that, in a case where the operation unit is positioned in the second position, an upper end of the operation unit is positioned above a supporting surface of the document stand in the vertical direction.

3. The image forming apparatus according to claim 1, wherein the supporting unit supports the operation unit such that, in a case where the operation unit is positioned in the first position, a lower surface of the operation unit is positioned above the occupied region in the vertical direction.

4. The image forming apparatus according to claim 1, wherein the supporting unit supports the operation unit such that, in a case where the operation unit is positioned in the first position, an upper surface of the operation unit is positioned at a height equal to or lower than a height of a supporting surface of the document stand in the vertical direction.

5. The image forming apparatus according to claim 4, wherein the sheet supporting portion is configured to support the operation unit such that, in the case where the operation unit is positioned in the first position, the display surface of the operation unit is flush with the supporting surface of the document stand in the vertical direction.

6. The image forming apparatus according to claim 1, wherein the operation unit is positioned inside of both sides of the casing in the width direction.

7. The image forming apparatus according to claim 6, wherein:

the casing includes side covers on both sides in the width direction, and the operation unit is positioned between two side covers in the width direction.

8. The image forming apparatus according to claim 1, wherein:

the document reading unit includes a document conveying unit, the document conveying unit is configured such that a downstream side of the document conveying unit in the sheet discharge direction is opened and closed with respect to the document stand, the document conveying unit is configured to automatically convey a document to a supporting surface of the document stand in a state where the document conveying unit is closed with respect to the document stand, and the closed document conveying unit is disposed upstream of the operation unit in the sheet discharge direction.

9. The image forming apparatus according to claim 2, further comprising a holding mechanism configured to hold the operation unit at an arbitrary angle.

10. The image forming apparatus according to claim 9, wherein the holding mechanism is a pipe-type structure in which a metallic shaft is press-fitted into a pipe.

* * * * *